United States Patent
Huang et al.

(10) Patent No.: US 6,292,835 B1
(45) Date of Patent: Sep. 18, 2001

(54) NETWORK BANDWIDTH AND OBJECT OBSOLESCENCE SENSITIVE SCHEDULING METHOD AND APPARATUS FOR OBJECTS DISTRIBUTED BROADCASTING

(75) Inventors: Yun-Wu Huang, Mount Kisco; Philip Shi-Lung Yu, Chappaqua, both of NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/979,029

(22) Filed: Nov. 26, 1997

(51) Int. Cl.[7] .......................... G06F 15/16; G06F 15/167
(52) U.S. Cl. ........................ 709/235; 709/203; 709/103; 709/217; 707/201; 707/203
(58) Field of Search ................................... 709/201, 102, 709/103, 218, 219, 229, 235, 118, 119; 370/232, 241, 234; 711/118, 119

(56) References Cited

U.S. PATENT DOCUMENTS

| | | | |
|---|---|---|---|
| 5,403,639 | * | 4/1995 | Belsan et al. ........................ 707/204 |
| 5,706,435 | * | 1/1998 | Barbara et al. ................. 395/200.09 |
| 5,727,159 | * | 3/1998 | Kikinis .............................. 395/200.76 |
| 5,754,774 | * | 5/1998 | Bittinger et al. ................ 395/200.33 |
| 5,778,368 | * | 7/1998 | Hogan et al. ........................... 707/10 |
| 5,781,732 | * | 7/1998 | Adams ............................ 395/200.35 |
| 5,829,001 | * | 10/1998 | Li et al. .................................. 707/10 |
| 5,867,483 | * | 2/1999 | Ennis et al. ........................... 370/252 |
| 5,920,701 | * | 7/1999 | Miller et al. .......................... 709/228 |
| 6,026,413 | * | 2/2000 | Challenger et al. ................. 707/202 |
| 6,029,175 | * | 2/2000 | Chow et al. .......................... 707/104 |

OTHER PUBLICATIONS

Computer Dictionary, Microsoft Press, 3erd Edition, 1997.*
"Caching Manager", Enterprise solutions—Intranet tools pointcast, 6 pages Jul. 29, 1998 http://www.pointcast.com/products/intranet/tools/cachingmgr/.html.? sucidex.
"The Castanet® Proxy", Marimba, Inc., 1997.
T. Ibaraki et al, "Resource Allocation Problems, Algorithmic Approaches", The Mit Press, Cambridge, Massachusetts, London, England, Chapter 4, pp. 52–78, 1988.

* cited by examiner

Primary Examiner—Le Hien Luu
Assistant Examiner—Beatriz Prieto
(74) Attorney, Agent, or Firm—Ference & Associates (57) ABSTRACT

A proxy strategy not only caches objects but actively sets update schedules for channel information disseminated from different servers. Based on available bandwidth, this proxy strategy formulates a mathematical function that can be solved to establish the proxy update schedules by maximizing the overall currency of information received by the clients. Clients whose update requests do not result in receiving the most upto-date information for a given channel may also be recorded. After the next scheduled proxy update for a given channel, the proxy actively sends the most up-to-date information for this channel to the recorded clients. The client interest for a given channel is measured based on the client updates the proxy received since last scheduled update for this channel, and the currency of information received by these clients. A dynamic update can be performed by the proxy for channels with high client interest before their respective scheduled updates based on the available bandwidth. Upon performing a dynamic update for a given channel, the proxy can delay the next schedule update for this channel by a whole regular proxy update interval.

17 Claims, 9 Drawing Sheets

NETWORK BANDWIDTH AND OBJECT OBSOLESCENCE SENSITIVE SCHEDULING METHOD AND APPARATUS FOR OBJECTS DISTRIBUTED BROADCASTING

FIELD OF THE INVENTION

The present invention relates to an improved data processing system, and more specifically, to the dissemination (or broadcasting, or replication) of information from servers to their networked clients. In particular, a method and apparatus are disclosed for transferring data while optimizing currency of information under bandwidth constraint by taking into account available bandwidth.

GLOSSARY OF TERMS

While dictionary meanings are intended for certain terms used here, the following glossary of terms may be useful.

Internet: The network of networks and gateways that use the TCP/IP suite of protocols.

Channel: A group of relevant objects (see object) published by a server (see server) and subscribed by many clients (see client).

Client: A computer which issues commands to the server which performs the task associated with the command.

Object: One or a group of multimedia objects. Each multimedia object can be a text document, a binary file, an image, a video/audio clip, etc.

Server: Any computer that performs a task at the command of another computer is a server. A web server or Lotus Notes server typically supports one or more clients.

Web Browser: A software system running on the clients that provides the interface for users to select desired objects, a mechanism to request and retrieve the desired objects from the servers, and the interface to display the retrieved objects to the users.

World Wide Web (WWW or Web): The Internet's application that lets people seeking information on the Internet switch from server to server and database to database by clicking on highlighted words or phrases of interest (hyperlinks). An Internet WWW server supports clients and provides information. The Web can be considered as the Internet with all of the resources addressed as URLs and which uses HTML to display the information corresponding to URLs and provide a point-and-click interface to other URLs.

BACKGROUND OF THE INVENTION

An essential function in many of today's data processing systems has been the dissemination of information from servers to clients via a computer network. In one class of such systems, information is continually sent from servers to a large number of clients. One example of such a system is object pushing on the World Wide Web (WWW or web). Another example is data replication in a distributed database system such as Lotus Notes.

Traditionally, object retrieval on the web is based on pull technology. In this approach, a web user retrieves a web object by clicking an icon or a hyperlink through a web browser, which then establishes a network connection to a web content provider and proceeds to download and display the requested object. If the requested information is retrieved through a slow network, a noticeable latency may occur at the user end. To avoid the long wait for pulling the requested documents, an alternative is to have the server push the information to the users based on pre-specified user preferences or profiles as soon as relevant information becomes available. The users therefore receive the requested information without having to wait. Currently, most push technologies are based on background pull where a software application, executing on behalf of the user, periodically pulls the requested objects in the background.

In a distributed database system such as Lotus Notes, server databases are used to store the complete original data, whereas each client is database can maintain a duplicate subset of the server data. It is important that the contents in the client databases reflect their corresponding subsets in the server databases as accurately as possible. To achieve this, a client database periodically invokes a data replication process which connects to the server and retrieves any new information from the server databases.

In both applications (object pushing in WWW and data replication in distributed systems), as well as other systems that require data be continually sent from the servers to the clients, an important consideration is when and how often the client contents are updated. Ideally, one would like the client contents to be updated whenever their corresponding server data changes. However, this is impractical as frequent updates from a large number of clients may demand a very high network bandwidth capability not available in most organizations that run the relevant systems such as object pushing on web or data replication in distributed databases. In practice, most of these systems adopt a default periodical update mechanism in which each client sets beforehand fixed update schedules, one for each server it subscribed to. In addition, many of these systems also provide a demand-driven update mechanism such that a client can immediately request an update from a certain server if an urgent need arises.

While the pure demand-driven update scheme can be too costly in terms of bandwidth usage, the regularly scheduled updates provide flexibility in preserving bandwidth. However, it may be important for clients to set an appropriate update frequency for each server to which they are subscribed. If the frequency is too high, network bandwidth may be overflowed with the update traffic; if the frequency is too low, the information maintained by the clients may become too outdated. In the case of object push in WWW, it has been found that users tend to inadequately specify their preferences for updates with high frequencies such that many corporate gateways are often flooded with push traffic.

To alleviate this push overflow problem, push product vendors have developed proprietary proxy server software. In general, these proxy servers cache recently retrieved push objects. For each push request, these proxy servers desirably search their cache for the requested objects. If an object is found in the cache, that object is sent back to the user who made the request. If an object is not found in cache, or if the found object is considered too old, these proxy servers may relay a background pull to the original content provider to retrieve the requested object via corporate gateways. This approach can improve the gateway traffic because some client requests will involve only the retrieval of information from the proxy server's cache, and the number of cross-gateway update requests will decrease as a result.

In this proxy approach, the proxy updates have replaced the client updates in direct contact with the servers, and it is the proxy's responsibility to keep the contents stored in their caches up to date in order to reflect the new changes from the servers. When more corporate users are subscribing to the increasing number of channels that publish push objects (as is the current trend), the proxy-based update traffic can still flood the gateways if it does not take into consideration the gateway traffic condition. The same analogy can also be applied to the problem of periodical data replication beyond local gateways in a distributed database system.

Another problem with the current scheduled update approach is that once a schedule is set, the updates follow the same frequency pattern until a new schedule is manually set at a later time. In many occasions, the interest in accessing the latest information from a channel changes over time and the current approach cannot adapt to these dynamic changes. For example, a sudden stock plunge could generate a tremendous number of instant interest within a finance-related organization. Many opportunities may be lost if its proxy server is not adaptive enough to provide more updated information than previously scheduled.

SUMMARY OF THE INVENTION

In a network in which data is transferred from servers to clients through a proxy, the update frequency with which data is cached by the proxy is determined. An indication of available bandwidth for performing updates of data cached by the proxy is received. When to update data cached by the proxy is then calculated based upon the indication of available bandwidth.

BRIEF DESCRIPTION OF THE DRAWINGS

These and other improvements are set forth in the following detailed description. For a better understanding of the invention with advantages and features, refer to the description and to the drawings, wherein.

DETAILED DESCRIPTION OF THE INVENTION

Overview

Figure 1:
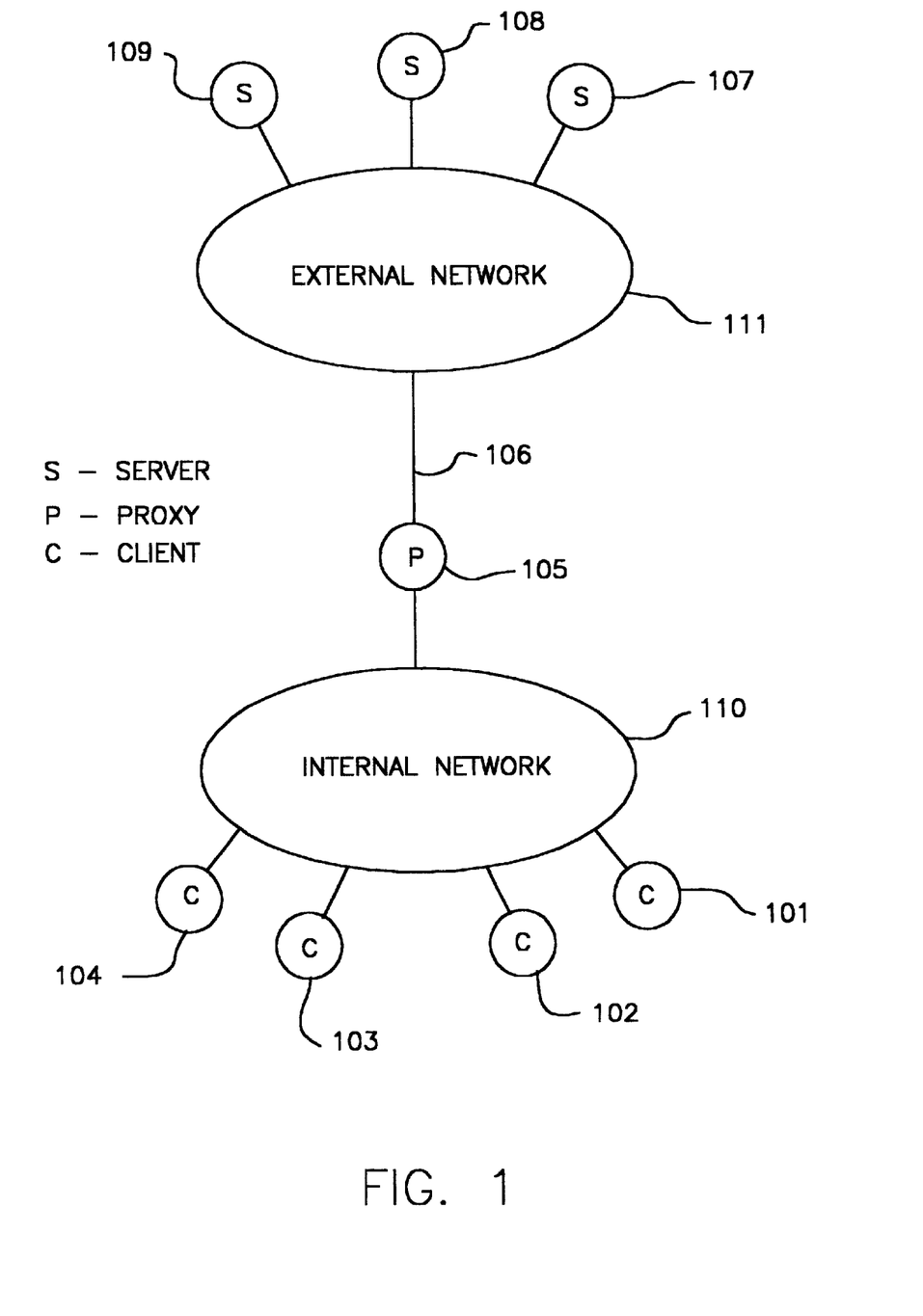
FIG. 1 is a block diagram which illustrates an exemplary proxy network architecture.

FIG. 1 is a block diagram which illustrates an example of an overall architecture of a network connection between the clients, the servers and a proxy in accordance with an exemplary embodiment of the present invention. As depicted, clients 101–104 are connected to local network 110 and servers 107–109 are connected to external network 111. The connection between the local and the external networks is through gateway 106.

Each server 107–109 is a data source that manages a set of dynamically changing information which can be of any of the multimedia types (e.g., text, binary file, image, audio and video clip). Each client 101–104 maintains subsets of information from one or more server data sources. In order to keep its information up to date, each client 101–104 sends update requests periodically to the servers where this clients information was originated. These update requests however do not go to the corresponding servers directly. Instead, they go through proxy 105 which serves as an intermediary between clients 101–104 and servers 107–109. Proxy 105 determines if client update requests should be relayed to corresponding servers or if potentially older copies of the requested objects cached previously by the proxy should be transmitted to clients making update requests. FIG. 1 show only one proxy. One skilled in the art will appreciate that there can be any number of proxies or a hierarchy of proxies and the clients can in fact send requests to one or more proxies for performing updates.

In a conventional proxy-based object pushing or data replication system, a proxy caches one newest copy for each object that the proxy received from the servers. Aside from the objects themselves, the proxy typically keeps meta information for each cached object which indicates when the object was created. This information tells the proxy how current each cached object is. Upon receiving an update request from a client, the proxy searches its cache. If the requested object is found in the cache, the proxy determines the currency of the object based on the creation time of the cached object. If the proxy determines the found object is current enough, this object is returned to the client who made the update request without incurring update traffic across the gateway. If the proxy determines that the found object is too outdated, or if the requested object is not located within the proxy's cache, then the proxy sends an update request to the corresponding server through the gateway on behalf of the requesting client. When the server sends back the requested object to the proxy, the proxy replaces the older copy of this object (if it exists) with the new one in its cache, updates the meta information (such as creation time) associated with this object, and also sends a new copy to the requesting client.

In this conventional proxy approach, in an attempt to reduce gateway traffic, a proxy serves as a passive intermediary storage to cache information. The only control a proxy has is in the determination of the currency of its cached objects based on comparing current time with object creation time. If a proxy allows a long time window for objects to be considered current, gateway traffic for object push or replication can be reduced but the cached objects may be very outdated. As a result, the proxy sends outdated objects to the requesting clients. If a proxy uses a very short time window to measure the currency of its cached objects, then the objects sent by the proxy to the requesting clients will not be as outdated but the reduction of gateway traffic for object push or replication is much less significant.

Conventional proxies do not engage servers in determining how often each object is updated. They do not react to the clients in terms of how often they wants their objects to be updated. Conventional proxies do not keep track of how much client interest each object has at a given time. Most importantly, they do not monitor the gateway or network traffic and service the update requests based on bandwidth availability. In general, the update schedules in the conventional proxy approach can be quite arbitrary and noneffective in optimizing gateway traffic and satisfying the user demands at the same time.

Figure 2:
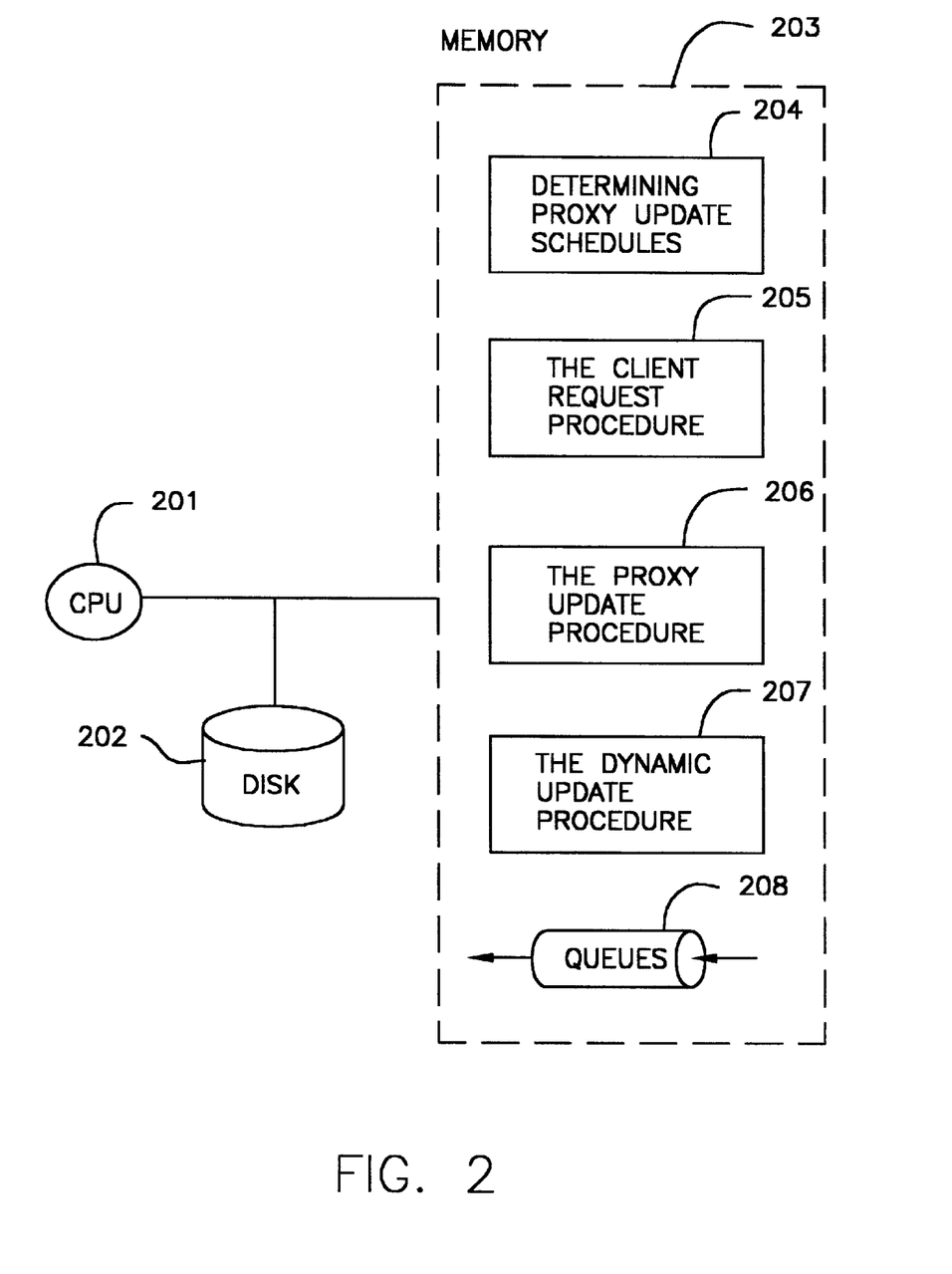
FIG. 2 is a block diagram which illustrates a proxy in accordance with an exemplary embodiment of the present invention.

FIG. 2 depicts a block diagram of a proxy server (or proxy) in accordance with an exemplary embodiment of the present invention. As is conventional, the proxy server includes CPU 201, disk 202 such as a magnetic, electronic, or optical storage media for persistent data and/or program/code storage. Those skilled in the art will appreciate that within the spirit and scope of the present invention, one or more of the components stored in memory 203 should be accessed and maintained directly via disk 202, network 110 (shown in FIG. 1), another proxy, or could be distributed across a plurality of proxies. Four important aspects of the proxy, preferably embodied as software executable on CPU 201, are the method to determine the proxy update schedules 204, a client request procedure 205, a proxy update procedure 206, and optional dynamic update procedure 207 which will be described in more detail with reference to FIGS. 3, 5, 6 and 8, respectively.

Dynamic update procedure 207 can be dynamically invoked by a proxy to process proxy updates for channels with high user interest before their respective next scheduled proxy updates. Memory contains queue structures 208 which are also relevant to an exemplary embodiment of the present invention. Queue structures 208 are used by the proxy to store the IDs of clients who, upon making update requests, have not received up-to-date information since the previous proxy update. More detail about these structures is discussed with reference to FIG. 5.

One aspect of the present invention is to provide a proxy with a method to set its update schedules that optimize the currency of objects based on bandwidth requirement and bandwidth availability. Unlike the conventional approach which monolithically assigns an expiration time window to objects from all data sources, an exemplary embodiment of the present invention contemplates the use of a server update schedule for each group of objects (channel) from all data sources. A server update interval for a set of objects is the time interval between two consecutive updates of these objects by the server. A server update interval for a certain channel can be obtained from the meta information that describes the objects (discussed later) or estimated and set by the proxy manager based on the classification of the channel. For example, based on estimation, a server update schedule for a stock update can be as frequent as every fifteen minutes while a server update schedule for a database replication can be as sparse as once a day.

From a client's point of view, the highest currency of an object at the client end can be achieved by the proxy servicing an update request every time the server updates its corresponding object (i.e., the proxy update schedule matches the server update schedule exactly). If the gateway (or in general the network) bandwidth availability discourages such frequent updates, as is usually the case, then the proxy may skip some server updates and may, instead, return less up-to-date copies of objects to the requesting clients in-between two consecutive proxy updates. In accordance with an exemplary embodiment of the present invention, a method is deployed to measure state of being out-of-date for objects received from the proxies to the clients. Furthermore, an objective function is formulated, based on the measured out-of-date status of objects received by the clients, to compute a proxy update schedule for each channel by minimizing the overall out-of-date degree. The formulated objective function is then solved by known techniques.

A Methodology to Determine Proxy Update Schedules

In accordance with an exemplary embodiment of the present invention, a method is incorporated to compute a proxy update schedule for each channel. This method is described based on the following terminology:

Total bandwidth (B): The total bandwidth is the gateway capacity, i.e., the number of bits the gateway can transmit per second.

Number of channel (N): The total number of channels subscribed to by the clients.

Server update intervals ($T_i$, $0<i<=N$): The number of time units between two server updates for channel i.

Proxy update intervals, ($K_i$, $0<i<=N$): The proxy update interval for channel i, $K_i$, is a multiple of its corresponding server update interval $T_i$. For example, the server of channel i updates its contents every $T_i$ time unit. Then the proxy updates the channel i contents in its cache every $K_i \times T_i$ time units ($K_i>=1$). The proxy update intervals are the computational results of the method that minimizes the total misses in the present invention.

Channel sizes ($S_i$, $0<i<=N$): The estimated size of objects in channel i. The meta information of the channel sizes is typically published by the channel providers in protocols such HTTP and MCF. Alternatively, the size of a channel can be estimated based on historical data.

Bandwidth percentage allocated (P): P is the percentage of maximum gateway bandwidth allocated for (push or replication) update traffic. P is set according to the policy of the organization that deploys the present invention. Because often times the gateway of an organization is also used for critical business operations, it is important that they are not deprived of network usage by the high volumes of update traffic. Therefore, setting a upper limit (in the form of a percentage P) for update traffic guarantees available bandwidth for critical operation traffic. Those skilled in the art will appreciate that by setting P=100% the update traffic will have access to the entire bandwidth, which is fitting to situations where update traffic is equally critical to regular operation traffic (such as the replication of critical data in a distributed system).

Maximum obsolescence thresholds ($U_i$, $0<i<=N$): A threshold $U_i$ is the maximally allowable number of obsolescence (explained below) for channel i. It is used to guarantee that no channel will remain outdated for a prolonged period of time.

Average numbers of client update requests ($\lambda_i$, $0<i<=N$): $\lambda_i$ is the average number of client update requests per time unit for channel i. Those skilled in the art will appreciate that $\lambda_i$ can be estimated based on historical pattern, and $1/\lambda_i$ is the number of time units between two user update requests for channel i.

Figure 3:
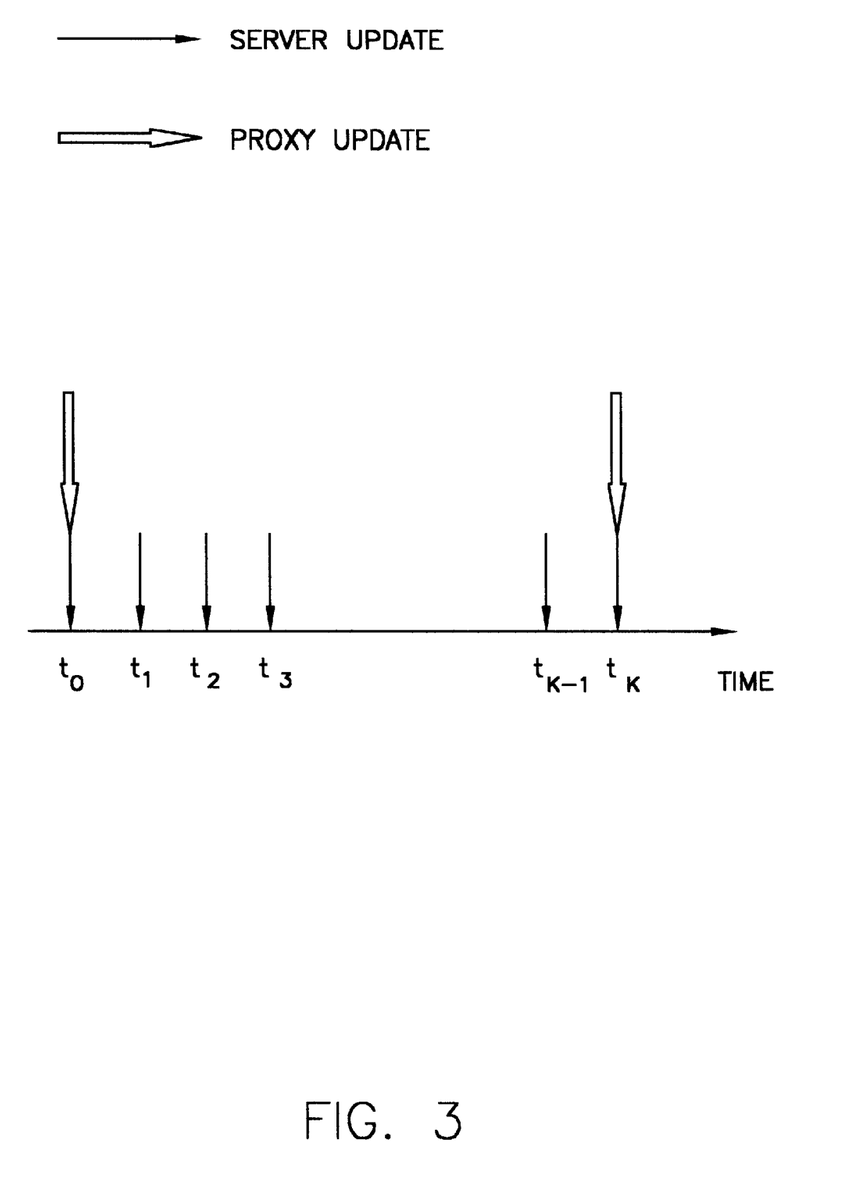
FIG. 3 is a time line which illustrates obsolescence of data within a proxy when that data is obtained from a server.

Using the above terminology, an objective function is established that computes a proxy update interval for each channel by maximizing the currency for objects received by the requesting clients. The currency is measured based on the number of obsolescence. The number of obsolescence of a client request for a given channel is defined as a number representing the difference in version between the requested object that the client possesses after the request is serviced by the proxy and the up-to-date copy of the same object available from the server. The higher the number of obsolescence for an object, the less current it is. For example, as depicted in FIG. 3, any client update requests arriving between $t_0$ and $t_1$ for channel i receive the most up-to-date information available from the corresponding server. The numbers of obsolescent associated with the clients who made these requests is therefore 0. Any clients requesting between $t_1$ and $t_2$ for channel i will have a copy that misses one server update. Their numbers of obsolescence is 1. The numbers of obsolescence associated with the clients requesting between $t_{k-1}$ and $t_k$ therefore is $K_i-1$.

The average number of user requests in each time period is $\lambda_i \times T_i$. Therefore the average number of obsolescence between $t_1$ and $t_2$ is $\lambda_i \times T_i \times 1$, between $t_2$ and $t_3$ is $\lambda_i \times T_i \times 2$, and so on. In general, the average number of obsolescence within a proxy update interval ($M_i$) for channel i is to add the average number of obsolescence for in all time periods between $t_0$ and $t_k$. Hence, $M_i = \lambda_i \times T_i \times ((K_i-1) \times K_i)/2$.

Summing up the average number of obsolescence for all channels, the aggregate number of total obsolescence (M) is obtained:

$$M = \Sigma_{(i=0 \text{ to } N)} \lambda_i \times T_i \times ((K_i-1) \times K_i)/2. \qquad 1$$

The objective of the method in determining the proxy update schedules in accordance with the present invention is to minimize M. But the determination of the proxy update schedules is desirably also constrained to the available bandwidth. The means that the proxy update requests should desirably not incur needs for more bandwidth than is available for update traffic. For each proxy update of channel i, an information of size $S_i$ is to be retrieved from the corresponding server through the gateway. Since the proxy update time interval channel i is $K_i \times T_i$, the minimum bandwidth needed to receive the new objects from channel i before next proxy update is $S_i/(K_i \times T_i)$. The total bandwidth needed for all channels therefore is $\Sigma_{(i=0 \text{ to } N)} S_i/(K_i \times T_i)$. The available bandwidth allocated for update traffic is $P \times B$. Therefore, the objective of minimizing the number of misses is desirably constrained by the following relation:

$$\Sigma_{(i=0 \text{ to } N)} S_i/(K_i \times T_i) <= P \times B. \qquad 2$$

To ensure that no channels will remain not updated for a prolonged period of time by the proxy, the objective of minimizing the number of misses desirably also has the constraint that no proxy update interval is greater than the allowable upper bound—the maximum miss thresholds $U_i$. This constraint is expressed by the following relation:

$$\text{for all } K_i, K_i <= U_i \qquad 3$$

Since $K_i$ is the only variable with $S_i$ and $T_i$ having known values, the relations 1, 2, and 3 can be rewritten as relations 4, 5, and 6 respectively by replacing $S_i/(K_i \times T_i)$ with a new variable $x_i$:

$$M = \Sigma_{(i=0 \text{ to } N)} f(x_i) = \Sigma(i=0 \text{ to } N) S_i/2 \times (\lambda_i \times S_i/T_i \times (x_i)^{-2} - (x_i)^{-1}). \qquad 4$$

$$\Sigma_{(i=0 \text{ to } N)} x_i <= P \times B. \qquad 5$$

$$\text{for all } x_i, x_i <= S_i/(U_i \times T_i). \qquad 6$$

The formulas 4, 5 and 6 can be rephrased as a resource allocation problem with a separable convex objective function:

Problem 1:

$$\text{minimize } \Sigma_{(i=0 \text{ to } N)} f(x_i),$$

where $$f(x_i) = S_i/2 \times (\lambda_i \times S_i/T_i \times (x_i)^{-2} - (x_i)^{-1}),$$

$$\text{subject to } \Sigma_{(i=0 \text{ to } N)} x_i = P \times B,$$

where $$x_i >= 0,$$

and for all $x_i$, $x_i >= S_i/(U_i \times T_i)$.

The solution to a resource allocation problem such as Problem 1 is known in the art (see, for example, Ibaraki, T., et al., Resource Allocation Problems, MIT Press, 1988).

The Event Driven Proxy Approach

Figure 4:
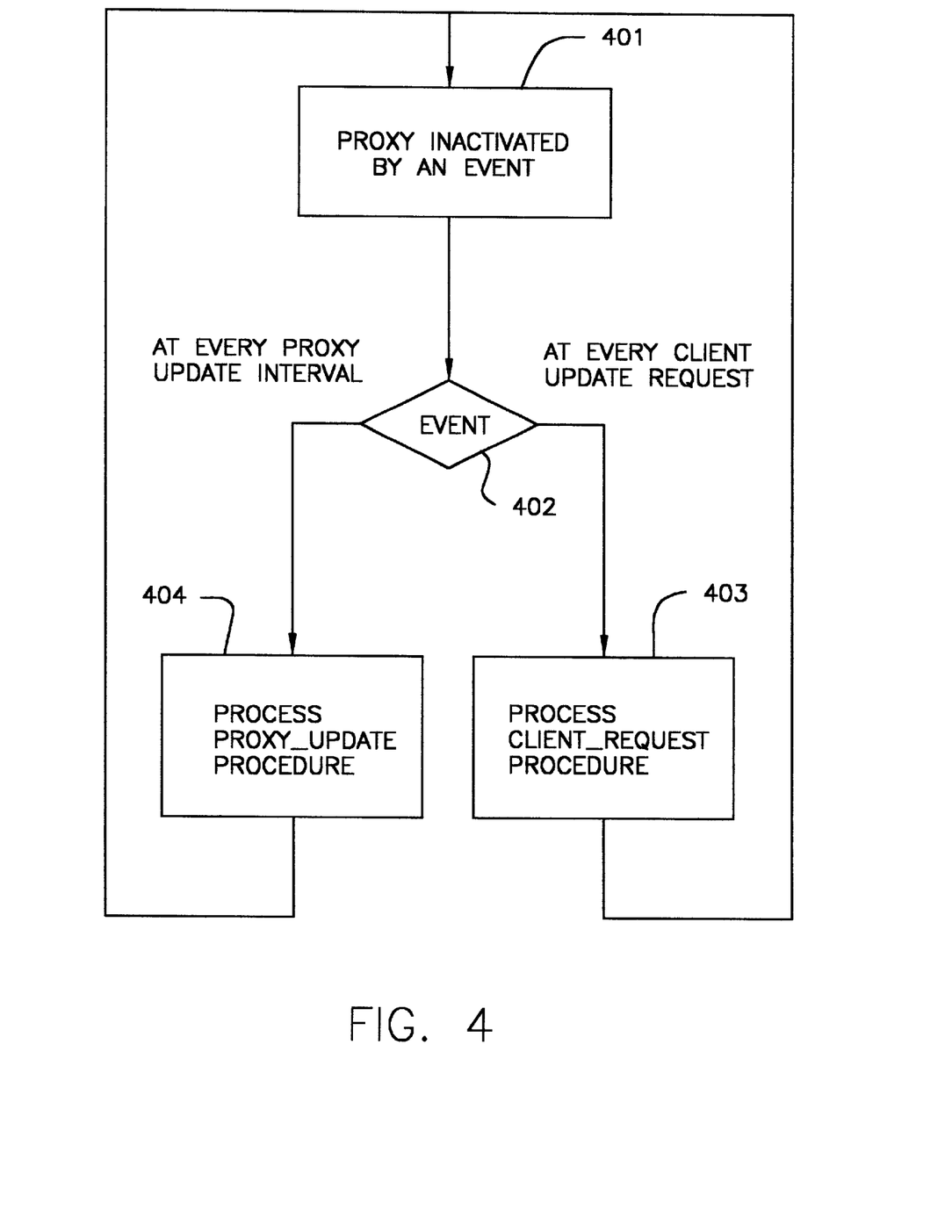
FIG. 4 is a flow chart diagram which illustrates operation of a proxy in accordance with an exemplary embodiment of the present invention.

In accordance with an exemplary embodiment of the present invention the aforementioned methodology is employed to determine a proxy update schedule for each channel. Depicted in FIG. 4, in accordance with an exemplary embodiment of the present invention, a proxy is inactivated at either each client update request or each scheduled proxy update for all channels 401 and will process the Client_Request 403 or Proxy_Update 404 procedures accordingly.

Figure 5:
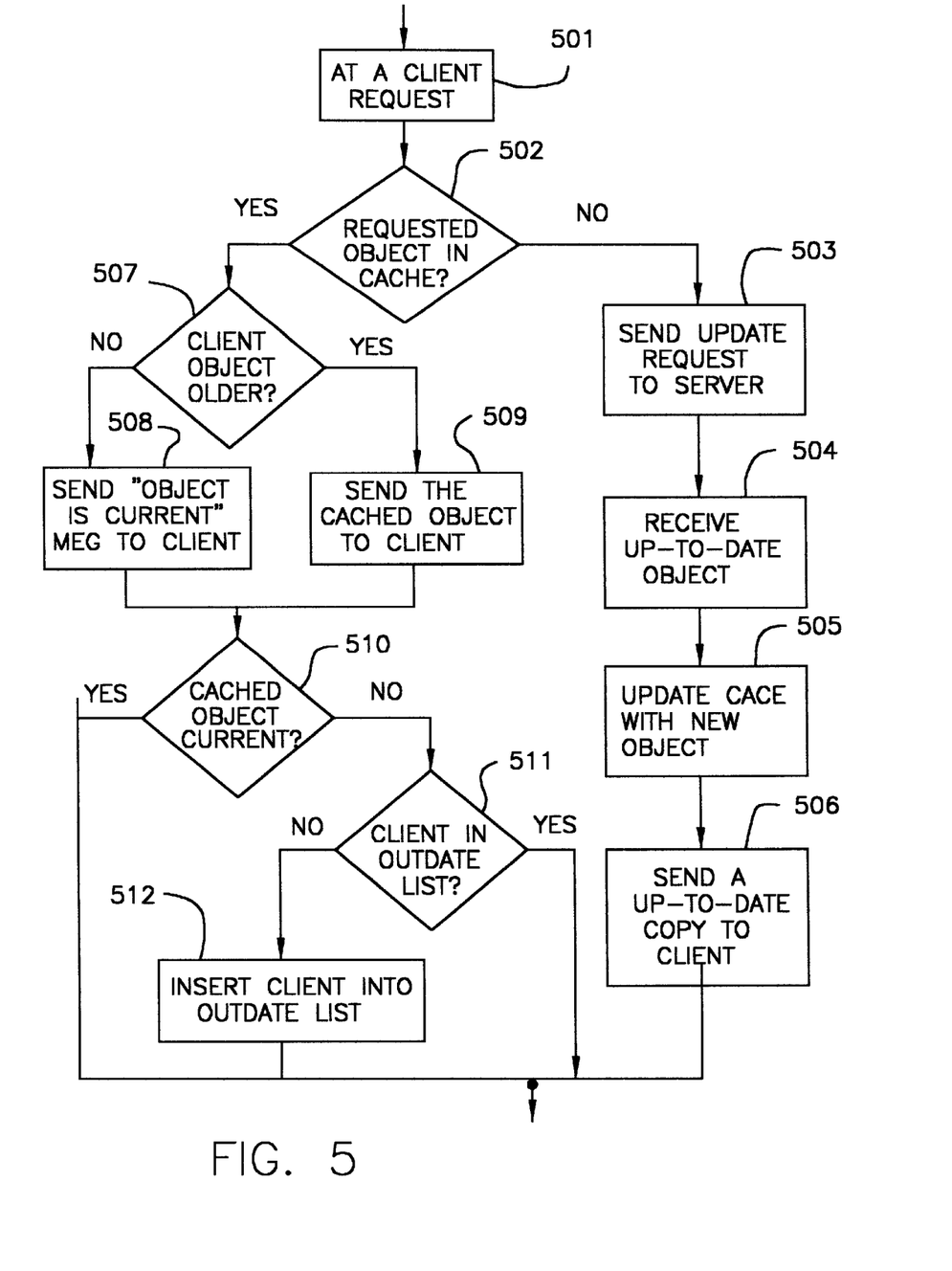
FIG. 5 is a flow chart diagram which illustrates handling of a client update request in accordance with an exemplary embodiment of the present invention.

Depicted in FIG. 5, upon receiving client update request 501, the proxy first checks to see if the requested object is in the cache 502. If the requested object is not in the cache, the proxy performs a proxy update 503 and upon receiving the most up-to-date object from the server 504, the proxy updates the cache with the newest object 505 and sends one copy to the requesting client 506.

If the requested object is found in cache, the proxy compares the creation time between the object owned by client and that in the cache to determine if the two copies are the same 507. The creation time of an object owned by the requesting client is also included in the update request message of this object. If the cached object and the one owned by the requesting client are the same, the proxy sends a "object is current" message back to requesting client 508. If the cached version is newer than the client version, the proxy sends a copy of the cache version to client 509. In either case, the proxy next determines if the cached version is the most up-to-date one from the server by using the object creation time of the cached object ($T_{create}$), current time ($T_{current}$), and the server update interval ($T_i$). If $T_{current} - T_{create} >= T_i$ meaning the cached object is not current 510. If the cached object is not current, the proxy inserts, if it does not already exist 511, the ID for the requesting client into a list (called the outdate list) indexed by the requested channel 512. The outdate list is a dynamic queue structure 208 that stores the client IDs.

Figure 6:
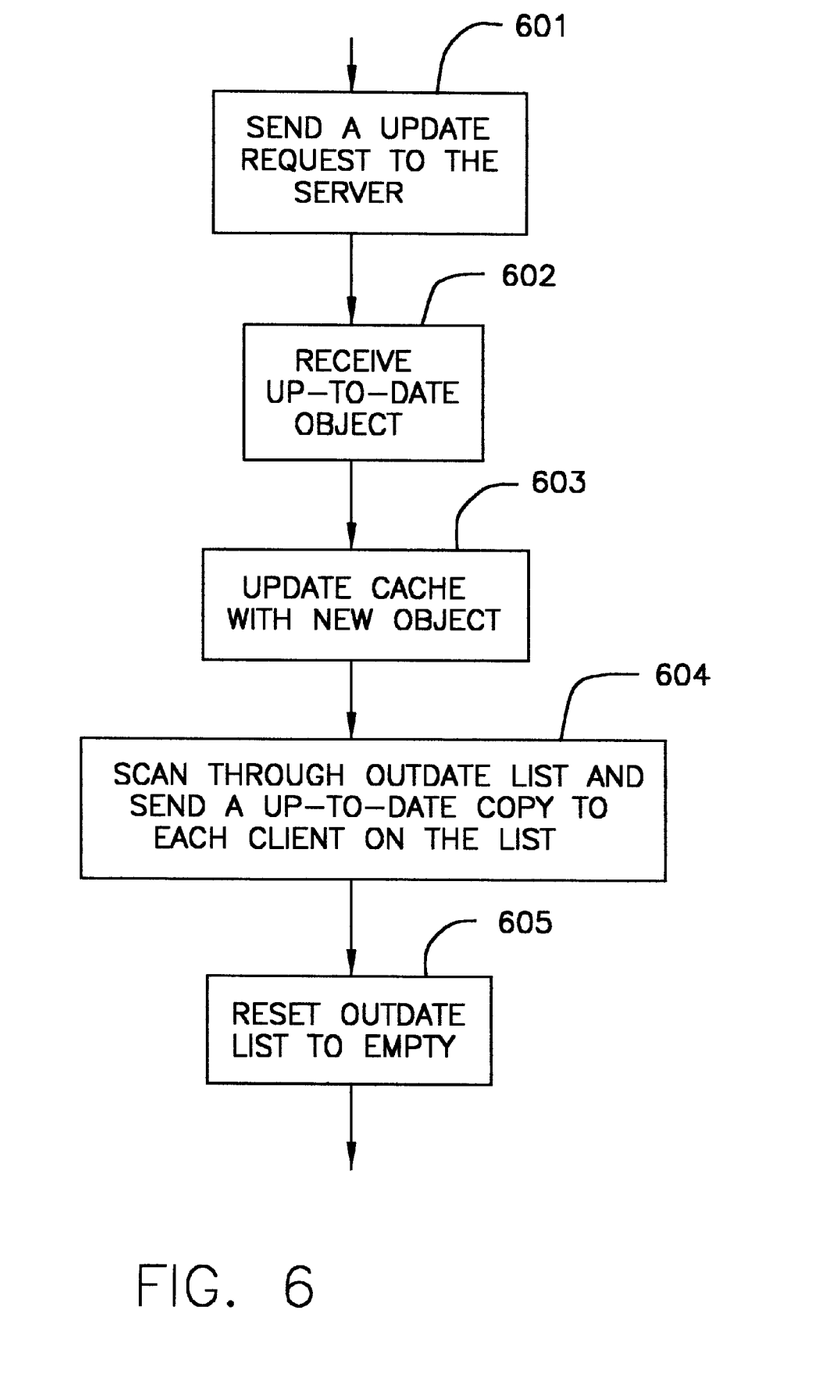
FIG. 6 is a flow chart diagram which illustrates handling of a proxy scheduled update in accordance with an exemplary embodiment of the present invention.

Depicted in FIG. 6, at each scheduled proxy update for every channel, the proxy sends a update request to corresponding server 601, and upon receiving the update-to-date object from server 602, the proxy updates its cache with the new object 603. Next, it scans through the outdate list associated with this updated channel and sends an up-to-date copy to each client in the outdate list 604. After all clients in the outdate list receive a up-to-date copy, the proxy resets the outdate list to empty 605.

Determining the Server Update Schedules

One parameter used in accordance with an exemplary embodiment of the present invention in determining the proxy update intervals is the server update intervals. For managed data processing systems such as Lotus Notes, the server update interval for each object is typically predetermined based on the nature of this object and the policy of the organization. These server update intervals can then be communicated off-line to all proxies to determine these proxies' respective update schedules.

For the server channels that publish web push objects, a meta information protocol such as CDF (Channel Definition Format) or MCF (Meta Content Framework) may be used to describe the push objects. The field SCHEDULE in CDF and the field contentUpdateSchedule in MCF may be used to describe the content providers' update schedules for their published push objects.

For objects whose update schedules are not published by their respective originating servers, their server update intervals can be estimated based on the nature and classification of the objects. For example, highly time critical data such as stock report can be given a short server update interval whereas less time critical information such as sport news can be assigned a longer update interval. The estimated server update intervals in this case serve as a way to measure the priority and urgency in the updating of their corresponding objects.

Dynamic Updates

An alternative embodiment of the present invention contemplates a procedure that allows a proxy to, based on client interests and available bandwidth, dynamically update channels before their respective next scheduled proxy updates. The aforementioned proxy update scheduling method in accordance with an exemplary embodiment of the present invention is based on average input data such as $k_i$ the average number of client update requests per time unit for each channel i. The resulting proxy update schedules are a set of fixed time intervals, one for each channel. Therefore, such update intervals cannot accommodate to the sudden rise of client interests in certain channels. An example of channels that could attract a sudden increase of client interests is the dramatic movements of stocks or other financial activities. A proxy unable to provide more timely updates may render its organization to miss potential opportunities. It is therefore very useful that the proxies react to client interests for a channel by providing additional dynamic update opportunities (within two consecutive scheduled intervals) during times when there exist a high number of client update requests for this channel.

Measuring Client Interests

The dynamic update feature in accordance with an exemplary embodiment of the present invention measures client interests by dynamically maintaining a obsolescence count for each channel. The obsolescence count $C_i$ for a channel i is the sum of the numbers of obsolescence associated with all clients in the outdate list of channel i. As mentioned before, the number of obsolescence of a client request for a given channel is a number representing the difference in version between the requested object that the client has after the request is serviced by the proxy and the up-to-date copy of the same object available from the server. The number of obsolescence associated with a client for a given channel at a given time is the highest number of obsolescence of all updates originated by this client for this channel.

Figure 7:
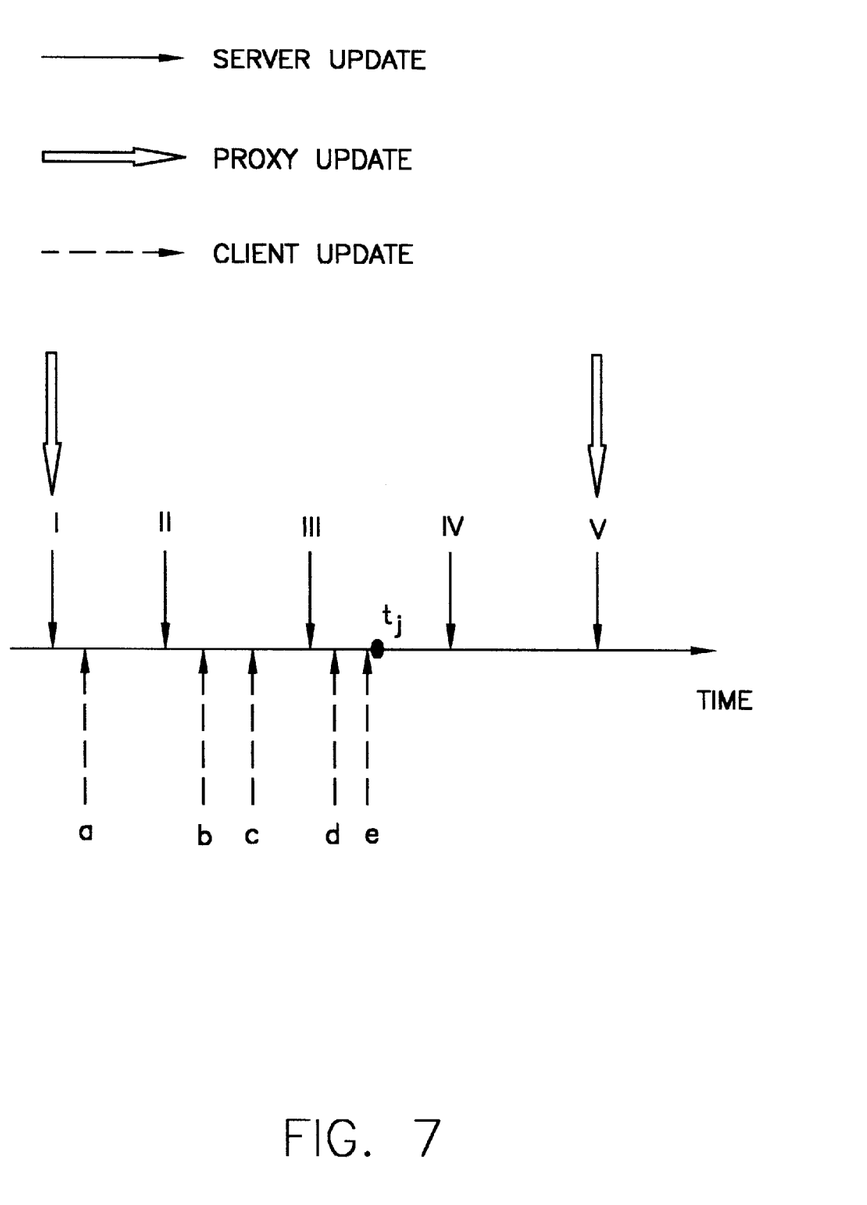
FIG. 7 is a time line which illustrates measurement of client interests.

The obsolescence count associated with a given channel i is updated every time the proxy receives a client request for this channel. For example, as depicted in FIG. 7 ($K_i$=4), at time $t_j$, the numbers of obsolescence of update requests a, b, c, d, e for a dynamic update channel i are 0, 1, 1, 2, 2 respectively. By way of example, these update requests are each from a different client. Then the obsolescence count for channel i in FIG. 7 at time $t_j$ is $C_i$=0+1+1+2+2=6.

Dynamic Update Procedure

To perform dynamic updates, the proxy first sets a dynamic update checkpoint interval C and the maximum traffic percentage M<100% in order to leave safe room for traffic bursts.

Figure 8:
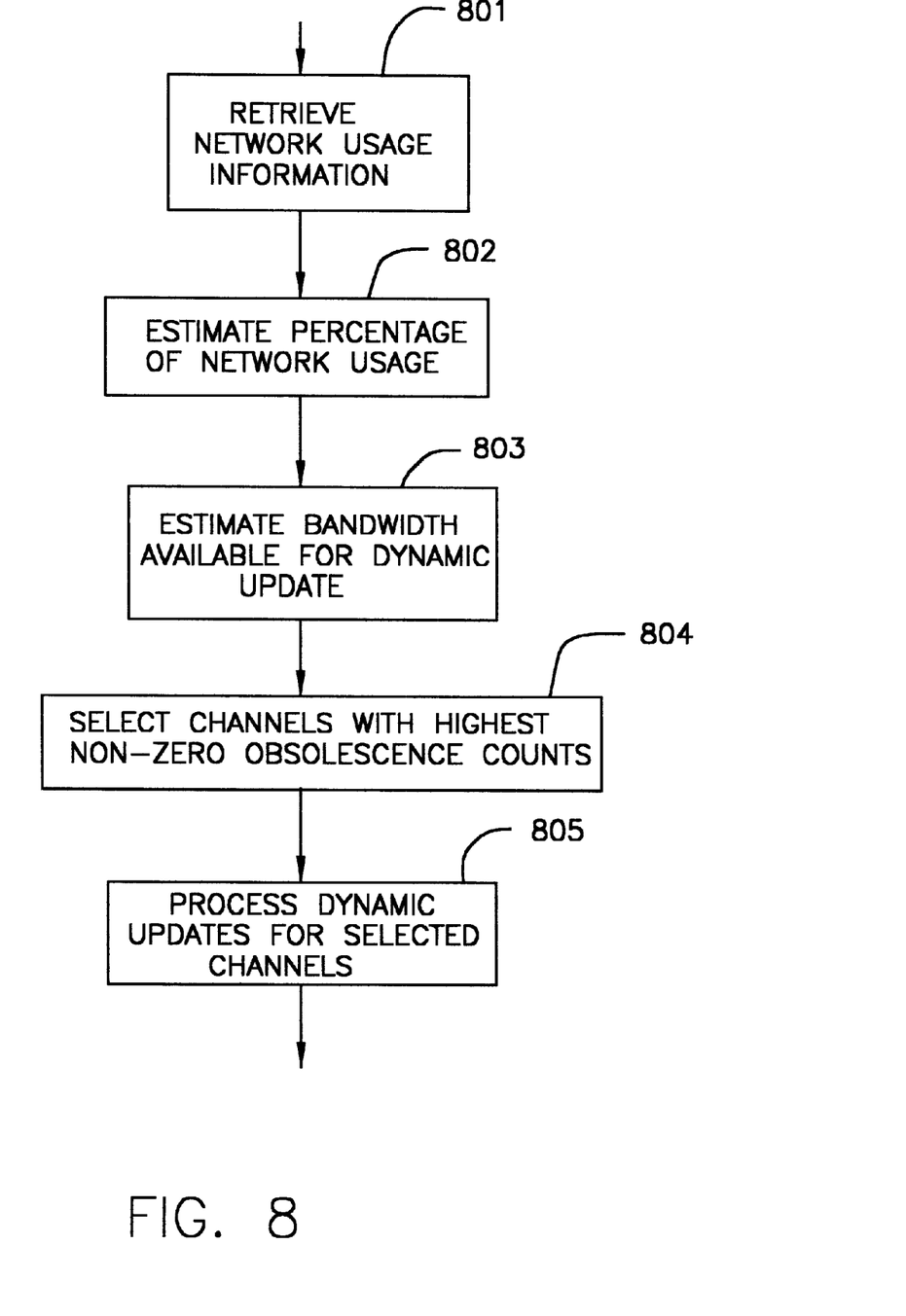
FIG. 8 is a flow chart diagram which illustrates handling of a dynamic update in accordance with an exemplary embodiment of the present invention.

At every dynamic update checkpoint, the proxy performs the Dynamic_Upate procedure as depicted in FIG. 8. In the Dynamic_Update procedure, the proxy first uses existing technologies to retrieve traffic information from the network devices 801 in order to measure the percentage of bandwidth used (O) for all traffic in the last C interval 802. One such technology may be, for example, SNMP (Simple Network Management Protocol) which supports the transmission of a data structure (called MIB, or Management Information Base) that contains network link usage information.

Next, as depicted in FIG. 8, the proxy estimates the percentage of the bandwidth available for dynamic updates (D) for the next C interval by deriving D=B×(M−O) at step 803. Next, the proxy selects the channels with the highest non-zero obsolescence counts such that the aggregate bandwidth required to transmit all the objects of these channels in the next C interval is as close to but not more than D at step 804. It is possible that some channels be skipped for dynamic updates because of their oversized objects. These channel are updated by their perspective next scheduled proxy updates. Finally, the proxy perform a dynamic update for each of the selected channels (805).

Adjusting the Proxy Update Schedule

Figure 9:
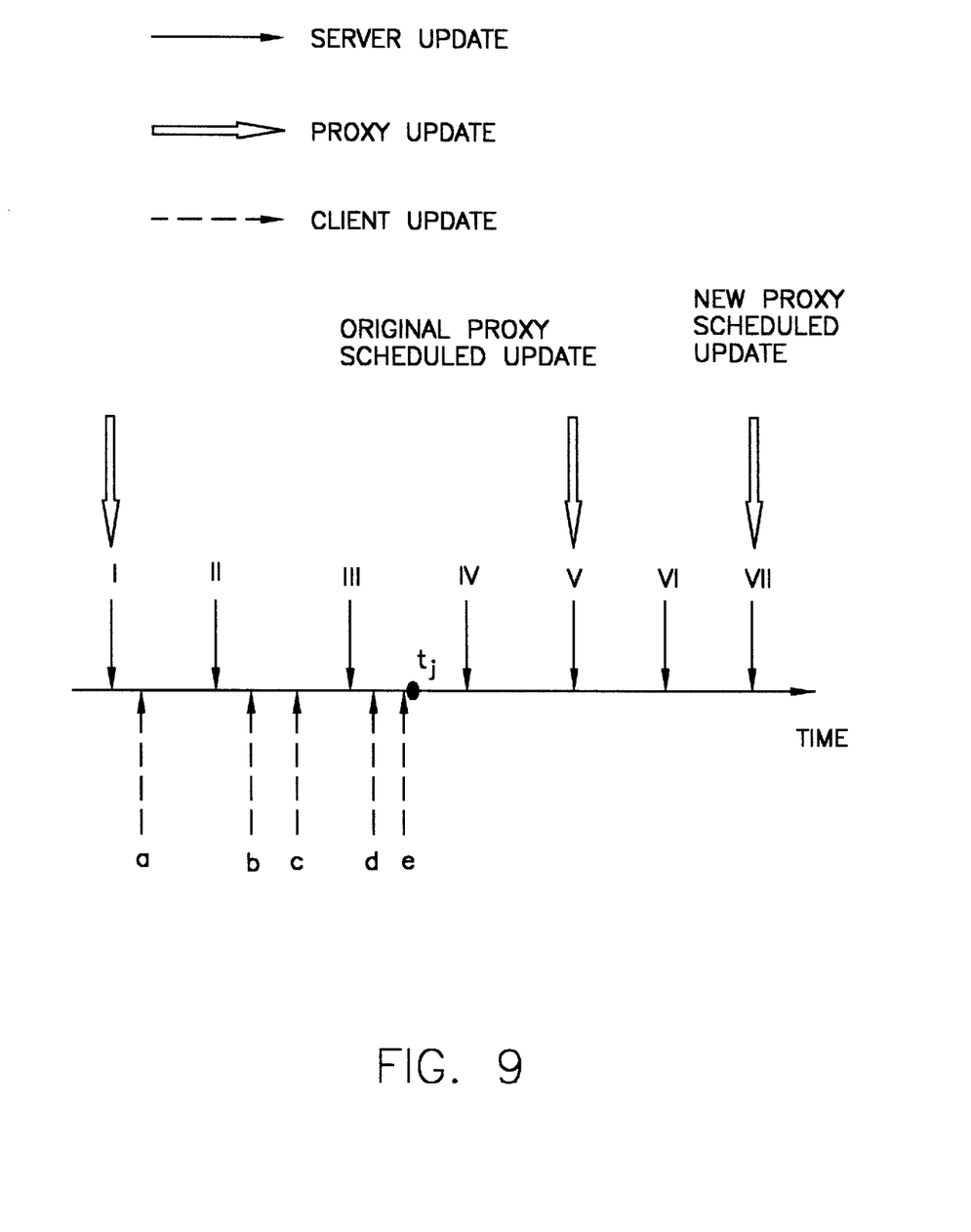
FIG. 9 is a time line which illustrates a proxy adjusting its update schedule in accordance with an exemplary embodiment of the present invention.

Once the proxy performs a dynamic update for a channel i, the next scheduled proxy update can happen in the very near future. For example, as depicted in FIG. 9, if a dynamic update is performed at time $t_j$, the time between this dynamic update and the next scheduled proxy update for this channel is approximately two server update intervals ($2 \times T_i$) which is less than the scheduled proxy update schedule $4 \times T_i$ ($K_i$=4) established for this channel. The dynamic update feature of an exemplary embodiment of the present invention resets the proxy update schedule back to established intervals by delaying the next proxy update to a fill proxy update interval $K_i \times T_i$ for this channel. For example, as depicted in FIG. 9, the original next proxy update was set right after server update V. A dynamic update at $t_j$now delays the next proxy update to right after server update VII, which is approximately $4 \times T_i$ from $t_j$.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. In a network comprising a plurality of servers which are each a source of data, a plurality of clients which each request data maintained in said servers, and a proxy which caches data received from said servers, a method for determining when to update data cached by said proxy, said method comprising the steps of:

receiving an indication of available network bandwidth between said plurality of servers and said proxy for performing updates of said data cached by said proxy;

receiving an indication of frequency with which at least one of said plurality of servers are updated;

maintaining a number of channels subscribed to by said clients and a channel size of each of the channels;

maintaining client request data, including a number of client requests for each of the channels;

deriving, from said indication of frequency and said client request data, obsolescence numbers associated with each channel, each of the obsolescence numbers reflecting the number of client requests for each channel that have received outdated data and reflecting how current said outdated data is; and dynamically calculating when to update said data cached by said proxy based upon said indication of available network bandwidth and said obsolescence numbers.

2. The method of claim 1, wherein said indication of frequency is obtained from meta information transmitted by said at least one of said plurality of servers.

3. The method of claim 2, wherein said meta information is transmitted using at least one of meta data protocol CDF and meta data protocol MCF.

4. The method of claim 1, wherein a source of said updates of data cached by said proxy include at least one of said plurality of servers.

5. The method of claim 1, wherein the available network bandwidth comprises a total network bandwidth between the proxy and a portion of the network to which at least one of the plurality of servers is situated.

6. The method of claim 1, wherein the available network bandwidth comprises an allocation of a total network bandwidth between the proxy and a portion of the network to which at least one of the plurality of servers is situated, said allocation intended for update traffic.

7. The method of claim 1 further comprising the step of maintaining a maximum obsolescence threshold for each of the channels, wherein the calculating step further comprises the step of calculating when to update said data cached by said proxy further based upon at least one maximum obsolescence threshold.

8. The method of claim 1, further comprising the steps of: receiving an indication of server updates not reflected by said proxy contents when at least one of said clients requests data from at least one of said servers; and calculating when to update data cached by said proxy further based upon said indication of server updates.

9. The method of claim 1, further comprising the step of delaying updating of data cached by said proxy responsive to a decrease in data request from at least one of said clients.

10. A program storage device, readable by a machine, tangibly embodying a program of instructions executable by the machine to perform method steps for determining when to update data cached by a proxy, according to the method steps of claim 1.

11. In a network comprising a plurality of servers which are each a source of data, a plurality of clients which each request data maintained in said servers, and a proxy which caches data received from said servers, a method for providing an up-to-date version of cached data comprising the steps of:
   receiving an indication of available network bandwidth between said plurality of servers and said proxy for performing updates of data cached by said proxy;
   receiving an indication of frequency with which at least one of said plurality of servers are updated;
   maintaining a number of channels subscribed to by said clients and a channel size of each of the channels;
   maintaining client request data, including a number of client requests for each of the channels;
   deriving, from said indication of frequency and said client request data, obsolescence numbers associated with each channel, each of the obsolescence numbers reflecting the number of client requests for each channel that have received outdated data and reflecting how current said outdated data is;
   dynamically calculating when to update data cached by said proxy based upon said indication of available network bandwidth and said obsolescence numbers;
   updating cached data based upon said calculating step;
   determining whether a requesting one of said clients has received said up-to-date version of cached data;
   providing said requesting one of said clients with available cached data when said requesting one of said clients makes said request; and
   providing said requesting one of said clients with said up-to-date version of cached data when available.

12. The method of claim 11, further comprising the steps of:
   maintaining a list of clients that have received cached data which differs from up-to-date data; and
   providing said clients with said up-to-date data upon receipt by said proxy.

13. A program storage device, readable by a machine, tangibly embodying a program of instructions executable by the machine to perform method steps for providing an up-to-date version of cached data, according to the method steps of claim 11.

14. A proxy which caches data received from servers and which provides said data to clients responsive to requests from said clients for said data, said proxy comprising:
   means for receiving an indication of available network bandwidth between said servers and said proxy for performing updates of data cached by said proxy;
   means for receiving an indication of frequency with which at least one of said plurality of servers are updated;
   means for maintaining a number of channels subscribed to by said clients and a channel size of each of the channels;
   means for maintaining client request data, including a number of client requests for each of the channels;
   means for deriving, from said indication of frequency and said client request data, obsolescence numbers associated with each channel, each of the obsolescence numbers reflecting the number of client requests for each channel that have received outdated data and reflecting how current said outdated data is;
   and means for dynamically calculating when to update data cached by said proxy based upon said indication of available network bandwidth and said obsolescence numbers.

15. The proxy of claim 14, further comprising means for delaying updating of data cached by said proxy responsive to a decrease in data requests from at least one of said clients.

16. In a network comprising a plurality of servers which are each a source of data, a plurality of clients which each request data maintained in said servers, and a proxy which caches data received from said servers, a program storage device, readable by a machine, tangibly embodying a program of instructions executable by the machine to perform method steps for determining when to update data cached by said proxy, said method comprising the steps of:
   receiving an indication of available network bandwidth between said plurality of servers and said proxy for performing updates of said data cached by said proxy;
   receiving an indication of frequency with which at least one of said plurality of servers are updated;
   maintaining a number of channels subscribed to by said clients and a channel size of each of the channels;
   maintaining client request data, including a number of client requests for each of the channels;
   deriving, from said indication of frequency and said client request data, obsolescence numbers associated with each channel, each of the obsolescence numbers reflecting accesses of each channel that have received outdated data and reflecting an outdatedness of said accesses; and
   dynamically calculating when to update said data cached by said proxy based upon said indication of available network bandwidth and said obsolescence numbers.

17. In a network comprising a plurality of servers which are each a source of data, a plurality of clients which each request data maintained in said servers, and a proxy which caches data received from said servers, a program storage device, readable by a machine, tangibly embodying a program of instructions executable by the machine to perform method steps for providing an up-to-date version of cached data comprising the steps of:

receiving an indication of available network bandwidth between said plurality of servers and said proxy for performing updates of data cached by said proxy;

receiving an indication of frequency with which at least one of said plurality of servers are updated;

maintaining a number of channels subscribed to by said clients and a channel size of each of the channels;

maintaining client request data, including a number of client requests for each of the channels;

deriving, from said indication of frequency and said client request data, obsolescence numbers associated with each channel, each of the obsolescence numbers reflecting accesses of each channel that have received outdated data and reflecting an outdatedness of said accesses;

dynamically calculating when to update data cached by said proxy based upon said indication of available network bandwidth and said obsolescence numbers;

updating cached data based upon said calculating step;

determining whether a requesting one of said clients has received said up-to-date version of cached data;

providing said requesting one of said clients with available cached data when said requesting one of said clients makes said request; and     providing said requesting one of said clients with said up-to-date version of cached data when available.

* * * * *